W. M. JONES & H. STEWART.
FASTENING FOR LOOPS AND THE LIKE.
APPLICATION FILED MAR. 18, 1909.
962,086.
Patented June 21, 1910.
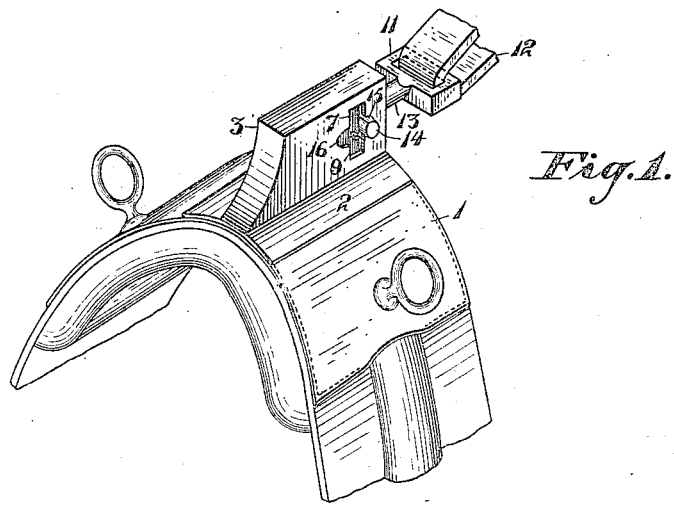

UNITED STATES PATENT OFFICE.

WILLIAM M. JONES AND HARLAND STEWART, OF SAN FRANCISCO, CALIFORNIA.

FASTENING FOR LOOPS AND THE LIKE.

962,086.  Specification of Letters Patent.  Patented June 21, 1910.

Application filed March 18, 1909. Serial No. 484,270.

*To all whom it may concern:*

Be it known that we, WILLIAM M. JONES and HARLAND STEWART, citizens of the United States, residing at San Francisco, in the county of San Francisco and State of California, have invented new and useful Improvements in Fastenings for Loops and the Like, of which the following is a specification.

The object of the present invention is to provide means for attaching a hook or loop to an object. In the present instance we show the device in use for attaching a check rein to a saddle, but it is to be understood that the invention is by no means limited thereto, but could be used for many other purposes.

In the accompanying drawing, Figure 1 is a perspective view of the upper portion of a saddle to which the device is attached; Fig. 2 is a vertical section, showing the same attached to the saddle; Fig. 3 is a section on the line 3—3 of Fig. 2 the saddle being omitted; Fig. 4 is a view similar to Fig. 3, showing the loop turned through a right angle ready for removal.

Referring to the drawing, 1 indicates a saddle and 2 a metal plate resting thereon. Upon the plate 2 is a casing 3, formed with depending bolts 4, which pass through holes in the plate 2 and through the upper side of the saddle, nuts 5 being screwed upon the lower ends of said bolts to attach the casing to the saddle. The plate 2 is used for the purpose of preventing undue wear of the casing upon the saddle. The casing is formed with a rectangular chamber 6 open at the front end of the casing, and in said chamber can reciprocate a follower 7, normally pressed forward by coiled springs 8. The sides of the casing are formed with openings 9, and into said openings extend the ends of a cross pin 10 in the follower, which ends, engaging the front edges of said openings 9, limit the forward movement of the follower.

11 is a loop adapted to be secured to a check rein 12, part of which is shown in Fig. 1, said loop being formed with a rearwardly directed stem 13 having a cross head 14 extending in a plane parallel to the loop.

To secure the loop in position, the loop is turned so that the cross head 14 can pass into the front open end of the chamber, as shown in Fig. 4, and, when said cross head has been thus inserted, the loop is pushed inward, pressing back the follower against the springs 8 until the cross head 14 has arrived opposite to the openings 9 in the sides of the casing. The loop is then turned into a plane at right angles at its former plane, as shown in Fig. 3, the ends of the loop extending through the openings 9 in the side of the casing. Said openings have central forward extensions 15 to receive the ends of said cross head, as well as rearward extensions 16 to receive the ends of the limiting pin 10 when the follower is pressed inward. The loop is held very firmly and securely in the casing, when in its attached position; for, in order to release it, it is necessary not only to press back the follower until the ends of the cross head are opposite to the central parts of the side openings in the casing, but also, when in this position, to turn the loop through a right angle from the position shown in Fig. 3 to the position shown in Fig. 4. This would never be done accidentally, and therefore the device furnishes a very secure means of attaching a loop or hook to a stationary device.

It is understood that the invention is not limited to the particular form of the loop here shown, as a hook, or, indeed, any other device to which can be attached a stem such as that shown at 13, may, by means of this attachment be securely connected to another object, although readily detachable when desired.

We claim:—

In a device of the character described, the combination of a casing of uniform dimensions throughout its length in the interior, and open at one end, a device having a stem and a cross head on said stem adapted to enter said open end, the casing having openings in its sides to receive the ends of said cross head when turned at right angles to the end opening, a follower within the casing abutting against said cross head, a pin extending transversely through the follower and projecting into said side openings to limit the movement thereof, said side openings having rearward extensions to receive the ends of said pin, and springs between the follower and the closed end of the casing, substantially as described.

In testimony whereof we have hereunto set our hands in the presence of two subscribing witnesses.

WILLIAM M. JONES.
HARLAND STEWART.

Witnesses:
WILLIAM HENRY CALVIN,
WILL McLAREN.